United States Patent
Crisp

(10) Patent No.: US 8,381,257 B1
(45) Date of Patent: Feb. 19, 2013

(54) PRIORITIZED CHANNEL SCANNING

(75) Inventor: Russell Crisp, Atlanta, GA (US)

(73) Assignee: ARRIS Group, Inc., Suwanee, GA (US)

( * ) Notice: Subject to any disclaimer, the term of this patent is extended or adjusted under 35 U.S.C. 154(b) by 233 days.

(21) Appl. No.: 12/901,904

(22) Filed: Oct. 11, 2010

Related U.S. Application Data

(60) Provisional application No. 61/251,134, filed on Oct. 13, 2009.

(51) Int. Cl.
*H04N 7/173* (2011.01)
*H04B 1/38* (2006.01)

(52) U.S. Cl. .................................. 725/111; 375/222

(58) Field of Classification Search .................... 725/111
See application file for complete search history.

(56) References Cited

U.S. PATENT DOCUMENTS

| | | | |
|---|---|---|---|
| 7,549,156 B2 * | 6/2009 | Li et al. ........................ | 725/111 |
| 7,584,498 B2 * | 9/2009 | Amshoff et al. ............... | 725/126 |
| 2006/0015918 A1 * | 1/2006 | Walston ........................ | 725/111 |
| 2009/0141784 A1 * | 6/2009 | Cho et al. ..................... | 375/222 |
| 2010/0017833 A1 * | 1/2010 | Abramson et al. ............ | 725/111 |

* cited by examiner

*Primary Examiner* — Chris Parry
(74) *Attorney, Agent, or Firm* — Troy A. Van Aacken; Robert J. Starr

(57) ABSTRACT

Methods, systems, and apparatus can be used to prioritize channel scanning. In various implementations, a nonvolatile memory on a CPE device can store downstream channels that a CPE device previously identified as being used by a headend. In some implementations, the nonvolatile memory can be organized or arranged such that DOCSIS 3.0 channels receive preference upon initialization. In other implementations, the selection of the channels from nonvolatile memory can be prioritized to select DOCSIS 3.0 channels over other types of channels.

7 Claims, 5 Drawing Sheets

PRIORITIZED CHANNEL SCANNING

RELATED APPLICATIONS

This application is a non-provisional application claiming the benefit of U.S. Provisional Application Ser. No. 61/251,134, entitled "Prioritized Channel Scanning," filed Oct. 13, 2009, which is hereby incorporated by reference in its entirety.

TECHNICAL FIELD

This disclosure relates to channel scanning.

BACKGROUND

The Data-Over-Cable Service Interface Specification (DOCSIS) was established by cable television network operators to facilitate transporting data traffic, primarily Internet traffic, over existing community antenna television (CATV) networks. In addition to transporting data traffic, as well as television content signals over a CATV network, multiple services operators (MSO) also use their CATV network infrastructure for carrying voice, video on demand (VoD) and video conferencing traffic signals, among other types.

The advent of DOCSIS 3.0 has facilitated the provision of better service to subscribers. However, because MSOs typically do not immediately upgrade their networks due to cost, the DOCSIS 3.0 equipment is backwards compatible with DOCSIS 2.0 and DOCSIS 1.X. Thus, the hybrid fiber coax (HFC) network typically includes both legacy DOCSIS channels and DOCSIS 3.0 channels. While subscribers would typically prefer their DOCSIS 3.0 equipment to connect to DOCSIS 3.0 channels, often these devices are connecting on legacy channels. The typical solution is for a cable modem termination system (CMTS) to move the DOCSIS 3.0 devices to DOCSIS 3.0 channels.

BRIEF DESCRIPTION OF THE DRAWINGS

Like reference numbers and designations in the various drawings indicate like elements.

DETAILED DESCRIPTION

In some implementations of this disclosure, systems and methods can operate to prioritize channel scanning. Prioritized channel scanning in CPE devices can facilitate the device reconnecting on a DOCSIS 3.0 channel after the device has restarted or reset for some reason. For example, a typical CPE device includes a nonvolatile data store (e.g., memory) where previously used channels are stored. Such channels are typically stored to increase the speed of initialization after a reset or restart, for example. Thus, when a CPE device initializes, it can provide a preference to those channels on which the device had previously connected to the network (if any). In some implementations of this disclosure, DOCSIS 3.0 channels can be provided preference to other channels. Therefore, the device can attempt to connect to the network using any DOCSIS 3.0 channels stored in the nonvolatile data store prior to attempting to connect to the network on legacy channels.

Figure 1:
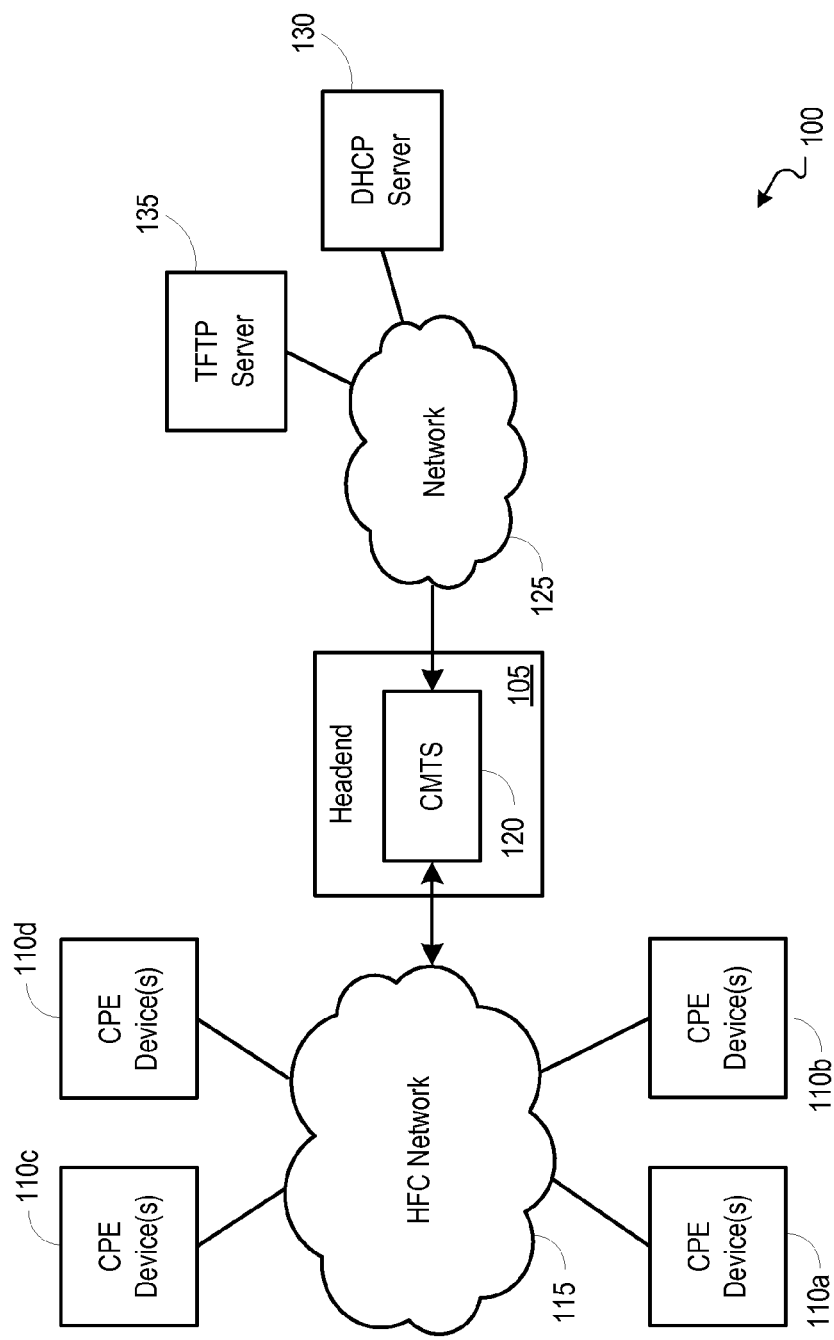
FIG. 1 is a block diagram illustrating an example network environment operable to provide prioritized channel scanning in CPE devices.

FIG. 1 is a block diagram illustrating an example network environment operable to provide prioritized channel scanning. In some implementations, a headend 105 can provide video, data and/or voice service(s) to customer premise equipment (CPE) devices 110a-d in one or more subscriber groups (e.g., service group(s)) through a hybrid fiber-coax (HFC) network 115. The headend 105 can include devices such as a cable modem termination system (CMTS) 120 and/or an edge quadrature amplitude modulation (EQAM) device (not shown), or a combined or converged device (not shown) including multiple edge and/or video or data processing functionalities. Such devices can operate to facilitate communications between a network 125 and the CPE device 110a-d. In various implementations, the network 125 can include one or more networks internal to the headend and/or one or more network external to the headend (e.g., one or more extranets, the Internet, etc.).

Data services can be handled by the headend 105 through a CMTS 120. The CMTS 120 can receive data signals from external device(s) or nodes through network(s) 125. The network(s) 125, for example, can operate using Internet protocol (IP), sending data packets to and receiving data packets from the headend 105. In some examples, the CMTS 120 can be paired with a SIP proxy server (not shown) operable to provide voice over internet protocol (VoIP) services with voice connectivity to other subscribers or voice connectivity to a public switched telephone network (PSTN) (not shown). In still further examples, one or more video sources may provide streaming data through the network(s) 125 to the CMTS 120

In some implementations, the CMTS 120 can forward packets destined for subscribers to an EQAM device used to modulate the signal onto a carrier waveform. The carrier waveform can include both data and video streams, in both multicast and unicast (e.g., point-to-point) formats for transmission to a combiner, which can combine multiple signals onto a single fiber for transmission to one or more CPE devices 110a-d via the hybrid fiber-coax (HFC) network 115. In other implementations, the CMTS 120 can modulate a baseband signal to a carrier wave and transmit the signal to a combiner for upconversion to a transmission frequency.

When a CPE device 110a-d initially attempts connect to the headend 105, the device 110a-d goes through a channel scanning, ranging and registration process with the headend 105. The channel scanning process can include the CPE device 110a-d checking a nonvolatile data store for channels on which the device 110a-d previously managed a successful connection to the headend. In some implementations, the nonvolatile data store (e.g., channel store) provides an order of preference to the channels. For example, the channels can be stored in preferential order whereby the most recently used channels in the non-volatile data store are provided preference over the least recently used channels in the non-volatile data store. However, the nonvolatile data store can be modified such that any DOCSIS 3.0 channels in the nonvolatile data store appear as more recently used than any DOCSIS 2.0 channels in the nonvolatile data store. For example, DOCSIS 3.0 channels can be retained in the front of a most recently used channel queue until the channel would normally be removed from the queue or another DOCSIS 3.0 channel replaces the DOCSIS 3.0 channel at the front of the queue.

In other implementations, there may be two separate sections of the non-volatile data store (e.g., two separate queues). The first section (e.g., queue) can be reserved for DOCSIS 3.0 channels, while the second section (e.g., queue) can be used for only DOCSIS 2.0 or higher channels. In such implementations, both sections may be used for DOCSIS 3.0 channels, however, while one section is reserved for only DOCSIS 3.0 channels. For example, if the nonvolatile data store were operable to store five channels, two of those channels might be reserved for DOCSIS 3.0 channels, while three can be used for any type of channel. In such an example, if the last five channels on which the device successfully performed ranging and registration were DOCSIS 3.0 channels, each of five slots in the nonvolatile data store would be occupied by DOCSIS 3.0 channels. However, if the last five channels on which the device successfully performed ranging and registration only included a single DOCSIS 3.0 channel and four DOCSIS 2.0 channels, the nonvolatile data store would include the single DOCSIS 3.0 channel and a previously successful DOCSIS 3.0 channel on which the device successfully performed ranging and registration (if any) though it was not one of the last five successful channels, and the three most recent DOCSIS 2.0 channels (e.g., selected from among the four DOCSIS 2.0 channels from the last five channels successfully used for ranging and registration).

In still further implementations, there can be two entirely separate queues for the channels. For example, a first queue might include only DOCSIS 3.0 channels, and a second queue might include only non-DOCSIS 3.0 channels. In this example, the first queue might include the last five DOCSIS 3.0 channels on which ranging and registration were successfully performed, and the second queue can include a mix of DOCSIS 1.x and 2.0 (e.g., legacy) channels on which the device successfully performed ranging and registration. Thus, upon initialization, the device can scan through the first queue to determine whether any of the previously successful DOCSIS 3.0 channels are used by the headend, before proceeding to scan through the second queue for previously successful non-DOCSIS 3.0 channels that are used by the headend. It should be understood that many other implementations can be used to provide prioritization to the DOCSIS 3.0 channels during channel scanning.

Ranging and registration typically includes ranging to account for distance of the device 110a-d from the headend 105 and registration to retrieve a configuration filename from a dynamic host control protocol (DHCP) server 130 through the network 125. Upon receipt of the configuration filename, the CPE device 110a-d identifies a trivial file transfer protocol (TFTP) server 135 where the configuration file is stored. The CPE device 110a-d can then request the configuration file from the TFTP server 135 using the filename provided by the DHCP server. Upon receiving the configuration file, the CPE device 110a-d can register with the CMTS 120.

Figure 2:
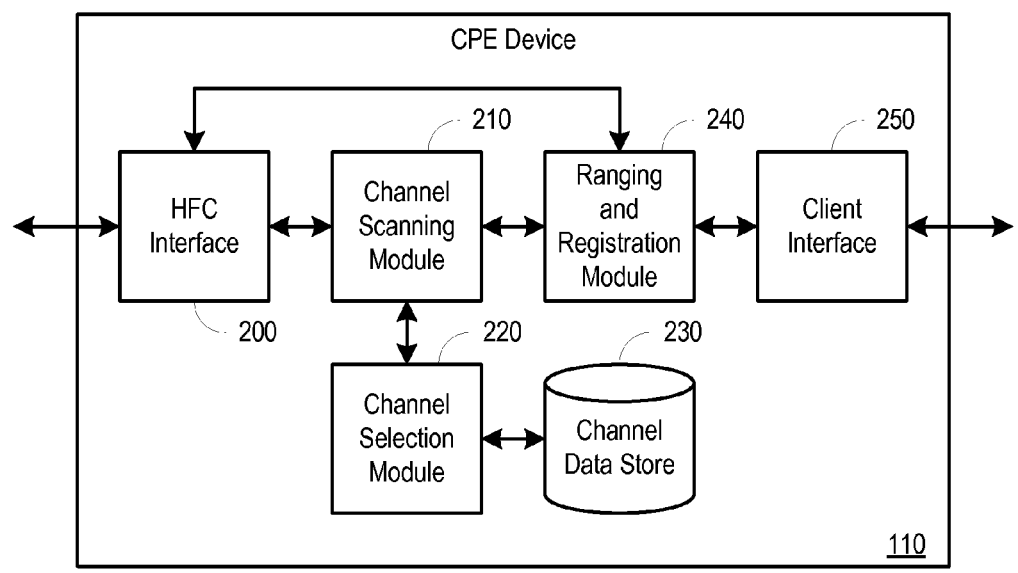
FIG. 2 is a block diagram illustrating a CPE device operable to use prioritized channel scanning.

FIG. 2 is a block diagram illustrating a CPE device 110 operable to use prioritized channel scanning. In some implementations, the CPE device 110 can include an HFC interface 200, a channel scanning module 210, a channel selection module 220, a channel data store 230, a ranging and registration module 240, and a client interface 250. The HFC interface 200 can operate to provide an interface to the HFC network (e.g., HFC network 115 of FIG. 1). In some implementations, the HFC interface can operate using an internet protocol.

The channel scanning module 210 can operate to scan channels during initialization (including e.g., reinitialization) of the device after, for example, a reset or restart. In some implementations, the channel scanning module 210 can receive channels from the channel selection module 220. In some implementations, the channel data store 230 can store channels in a prioritized order. Thus, channels receiving high priority can be stored at the front of a selection queue, while channels with low priority can be stored at the back of a selection queue. Thus, the channel selection module 220, upon storing channels into the channel data store 230 can store DOCSIS 3.0 channels at the front of the data store 230, and storing DOCSIS 2.0 channels at the back of the data store 230. In further implementations, a first number of slots (e.g., three slots) in a channel data store 230 can be reserved for DOCSIS 3.0 channels, while other slots in the channel data store 230 are unreserved and can be used for storing any type of DOCSIS channel. In other implementations, the channel selection module can dynamically identify whether any of the channels in the channel data store 230 are DOCSIS 3.0 channels, and provide priority for those channels over other channels stored within the channel data store. Other prioritization mechanisms are possible.

Once a selected channel has been received from the channel selection module 220 (e.g., in conjunction with the channel data store 230), the channel scanning module 210 can tune a tuner and/or demodulator (not shown) associated with the CPE device 110 to a frequency associated with the selected channel. If the demodulator achieves data lock on the channel, the channel is identified as a downstream channel. The CPE device 110 can then proceed to collect upstream channel descriptor (UCD) messages on the downstream channel. If the channel scanning module does not achieve data lock on the selected downstream channel provided by the channel selection module 220, the channel selection module 220 can select another channel based upon the channel data store 230, until achieving data lock and collecting UCD messages.

The UCD messages can typically include an upstream channel identifier (UCIDs) identifying an upstream channel supported by the CMTS that sent the downstream channel on which the CPE device 110 achieved data lock. Typically, a device can collect multiple UCD messages, thereby collecting multiple UCIDs. The CPE device 110 can then attempt to perform ranging and registration with a ranging and registration module 240 using a selected UCID within the UCD messages. In some implementations, the CPE device 110 can also provide preference to DOCSIS 3.0 UCIDs for ranging and registration based upon the channel selection module 220 in conjunction with the channel data store 230. The ranging and registration functionality is fully described within the DOCSIS 2.0 and DOCSIS 3.0 specifications, which are hereby incorporated by reference.

If ranging and registration by the ranging and registration module 240 is unsuccessful, the ranging and registration module 240 can notify the channel scanning module 210. The channel scanning module can then request another channel from the channel selection module 220. The channel selection module 220 can thereby select another channel from the channel data store 230, and return the selected channel to the channel scanning module. If data lock is achieved on the selected channel, the channel scanning module can identify UCIDs from UCD messages on the downstream channel, and the ranging and registration module can attempt ranging and registration using the identified UCIDs. The process can repeat until the CPE device 110 is successfully connected to the headend.

The client interface 250 can interface to a client device. In some implementations, the client device may be one or more network, a wireless router, a user computer, etc.

Figure 3:
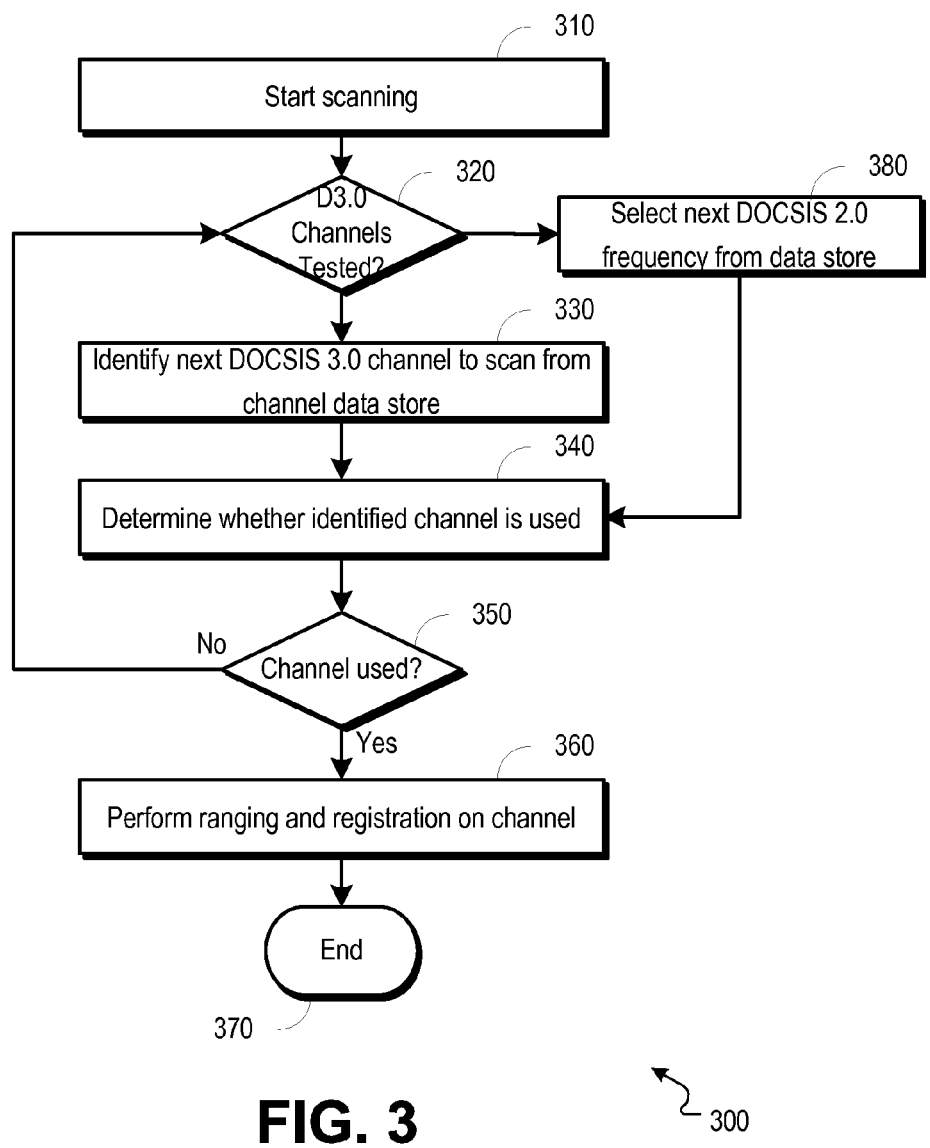
FIG. 3 is a flowchart illustrating an example process for prioritized channel scanning.

FIG. 3 is a flowchart illustrating an example process 300 for prioritized channel scanning. The process 300 begins at stage 310 by starting a scan. The scanning can be started, for example, by a channel scanning module (e.g., channel scanning module 210 of FIG. 2). In some implementations, the scanning can be intelligent or directed. For example, if a device has been used before, the device can try to scan a channel that was previously successful.

At stage 320, a determination is made whether all DOCSIS 3.0 channels have been tested. The determination can be made, for example, by a channel selection module (e.g., channel selection module 220 of FIG. 2) in conjunction with a channel data store (e.g., channel data store 230 of FIG. 2). In some implementations, a channel selection module can identify all DOCSIS 3.0 channels (e.g., based upon information stored in the channel data store) and cycle through the DOCSIS 3.0 channels until all DOCSIS 3.0 channels in the channel data store are tested.

At stage 330, a next DOCSIS 3.0 channel to scan is identified. The next frequency can be identified, for example, by a channel selection module (e.g., channel selection module of 220 of FIG. 2) in conjunction with a channel data store (e.g., channel data store 230 of FIG. 2). In some implementations, the channel selection module can cycle through DOCSIS 3.0 channels stored in the channel data store based upon a most recently updated algorithm. Thus, the most recently updated records for DOCSIS 3.0 channels in the channel data store will be tested first, followed by the next most recently updated DOCSIS 3.0 channel, and so on. Other algorithms for cycling through DOCSIS 3.0 channels can be used.

At stage 340, a determination is made whether the identified channel is used. The determination of whether the identified channel is used can be made, for example, by a channel scanning module (e.g., channel scanning module 210 of FIG. 2). In some implementations, the determination of whether the identified channel is used can be made by setting (e.g., tuning) a tuner and/or a demodulator to a frequency associated with the identified channel and determining whether the data recovered is valid. Thus, if the channel is used (e.g., loaded), the channel scanning module can lock onto the channel and recover valid data. Such a channel can also be referred to as lockable.

At stage 350, a decision is made whether the channel is used. The decision can be made, for example, by a channel scanning module (e.g., channel scanning module 210 of FIG. 2). If the channel is not used, the process 300 returns to stage 320 where it is determined whether any more DOCSIS 3.0 channels that have not been tested exist. However, if the channel is used, the process 300 proceeds to stage 360 where ranging and registration are performed on the channel. Ranging and registration can be performed, for example, by a ranging and registration module (e.g., ranging and registration module 240 of FIG. 2). In some implementations, ranging and registration can be performed substantially as identified by any of the DOCSIS standards. The process 300 ends at stage 370.

Returning to stage 320, if all DOCSIS 3.0 channels in the channel data store have been tested, the process proceeds to stage 380 to select a DOCSIS 2.0 frequency from the channel data store. The DOCSIS 2.0 frequency can be selected, for example, by a channel selection module (e.g., channel selection module 220 of FIG. 2) in conjunction with a channel data store (e.g., channel data store 230 of FIG. 2). In some implementations, the channel selection module can cycle through the DOCSIS 2.0 channels stored in the channel data store using a most recently updated algorithm. Other algorithms for cycling through the DOCSIS 2.0 channels can be used, including for example, a most commonly used algorithm. It should be understood that after cycling through all DOCSIS 2.0 channels, the process can terminate, and the CPE device can begin scanning downstream channels according to other processes.

Figure 4:
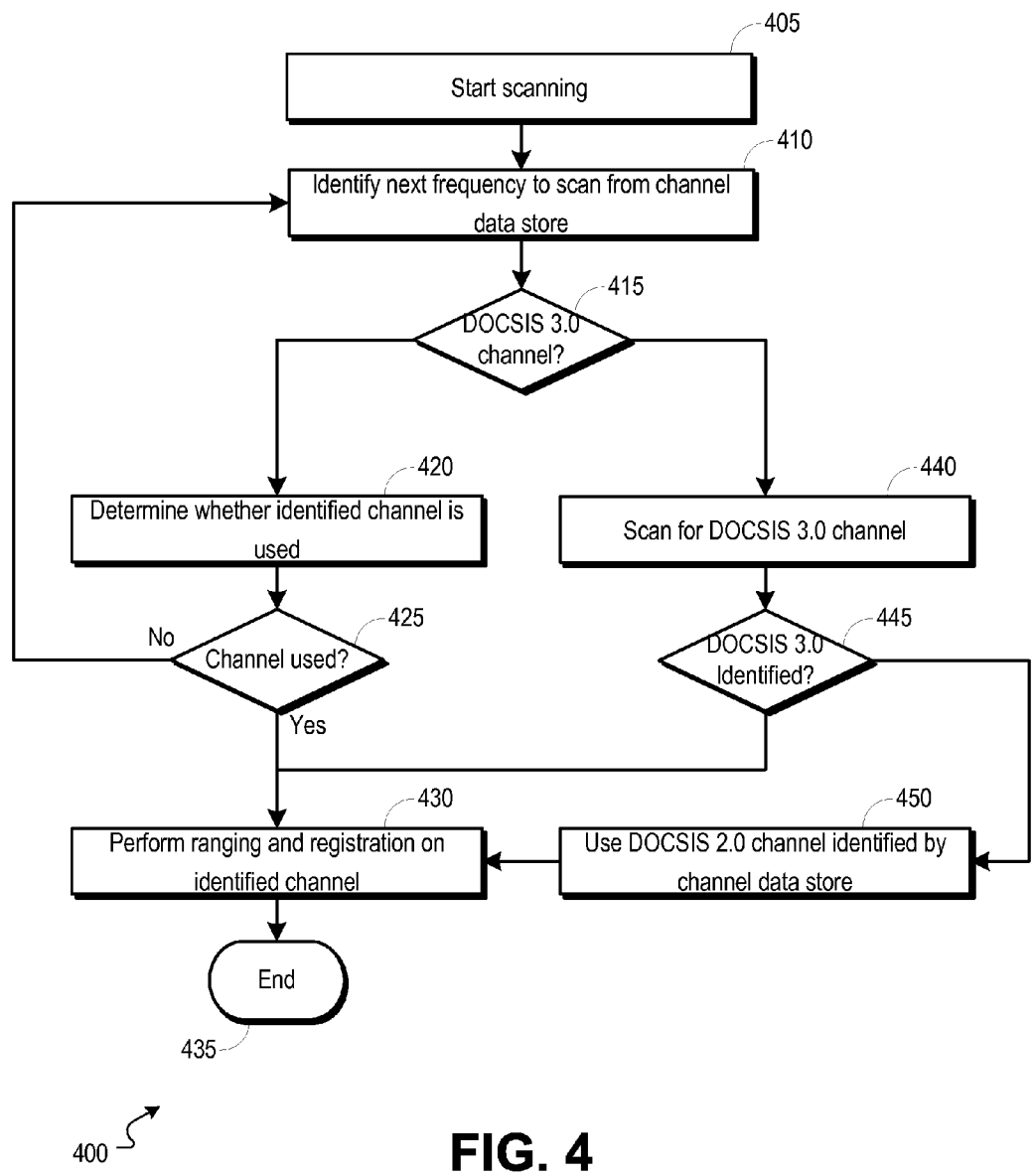
FIG. 4 is a flowchart illustrating another example process for prioritized channel scanning.

FIG. 4 is a flowchart illustrating another example process 400 for prioritized channel scanning. The process 400 begins at stage 405 by starting a scan. The scanning can be started, for example, by a channel scanning module (e.g., channel scanning module 210 of FIG. 2). In some implementations, the scanning can be intelligent or directed. For example, if a device has been used before, the device can try to scan a channel that was previously successful.

At stage 410, a next frequency to scan is identified from a channel data store. The next frequency can be identified, for example, by a channel selection module (e.g., channel selection module of 220 of FIG. 2) in conjunction with a channel data store (e.g., channel data store 230 of FIG. 2). In some implementations, the channel selection module can prioritize scanning of DOCSIS 3.0 channels that were previously successful. In other implementations, the channel selection module can organize the channel data store in an order such that the channels stored in the channel data store provide preference to DOCSIS 3.0 channels that were previously successful over DOCSIS 2.0 or DOCSIS 1.x channels that were previously successful.

At stage 415, a determination is made whether the identified channel is a DOCSIS 3.0 channel. The determination of whether the identified channel is a DOCSIS 3.0 channel can be made, for example, by a channel selection module (e.g., channel selection module 220 of FIG. 2). In some implementations, whether a channel is a DOCSIS 3.0 channel can be made based upon data associated with the channel in the channel data store.

At stage 420, a determination of whether the downstream channel is used is made. The determination of whether the downstream channel is used can be made, for example, by a channel scanning module (e.g. channel scanning module 210 of FIG. 2). In some implementations, the determination of whether the identified channel is used can be made by setting (e.g., tuning) a tuner and/or a demodulator to a frequency associated with the identified channel and determining whether the data recovered is valid.

At stage 425, a decision is made based on the determination of whether the downstream channel is used. The decision can be made, for example, by a channel scanning module (e.g., channel scanning module 210 of FIG. 2). If the channel is not used, the process 400 returns to stage 410 where a next channel is identified. If the channel is used, the process 400 proceeds to stage 430 where ranging and registration are performed on the channel. Ranging and registration can be performed, for example, by a ranging and registration module (e.g., ranging and registration module 240 of FIG. 2). In some implementations, ranging and registration can be performed substantially as identified by any of the DOCSIS standards. The process 400 ends at stage 435.

Returning to stage 415, if a determination is made that there are no DOCSIS 3.0 channels in a channel data store, the process can proceed to stage 440 to scan for a DOCSIS 3.0 downstream channel. The scan for a DOCSIS 3.0 downstream channel can be performed, for example, by a channel scanning module (e.g., channel scanning module 210 of FIG. 2).

At stage 445, a determination is made whether a DOCSIS 3.0 channel is found. The determination can be made, for example, by a channel scanning module (e.g., channel scanning module 210 of FIG. 2). In some implementations, the determination can be made based upon data identified within the downstream signal. If a DOCSIS 3.0 channel is identified, the process can proceed to stage 430, where ranging and registration can be performed on the identified channel. The process 400 ends at stage 435.

If no DOCSIS 3.0 channel is identified, the process can proceed to stage 450, where DOCSIS 2.0 channels identified from the data store are used for scanning. The DOCSIS 2.0 channels can be identified and used for scanning, for example, by a channel scanning module (e.g., channel scanning module 210 of FIG. 2) in conjunction with a channel selection module (e.g., channel selection module 220 of FIG. 2) and a channel data store (e.g., channel data store 230 of FIG. 2). Upon selection of a loaded downstream DOCSIS 2.0 channel, the process can proceed to stage 430 to perform ranging and registration on the DOCSIS 2.0 channel. The process ends at stage 435.

Figure 5:
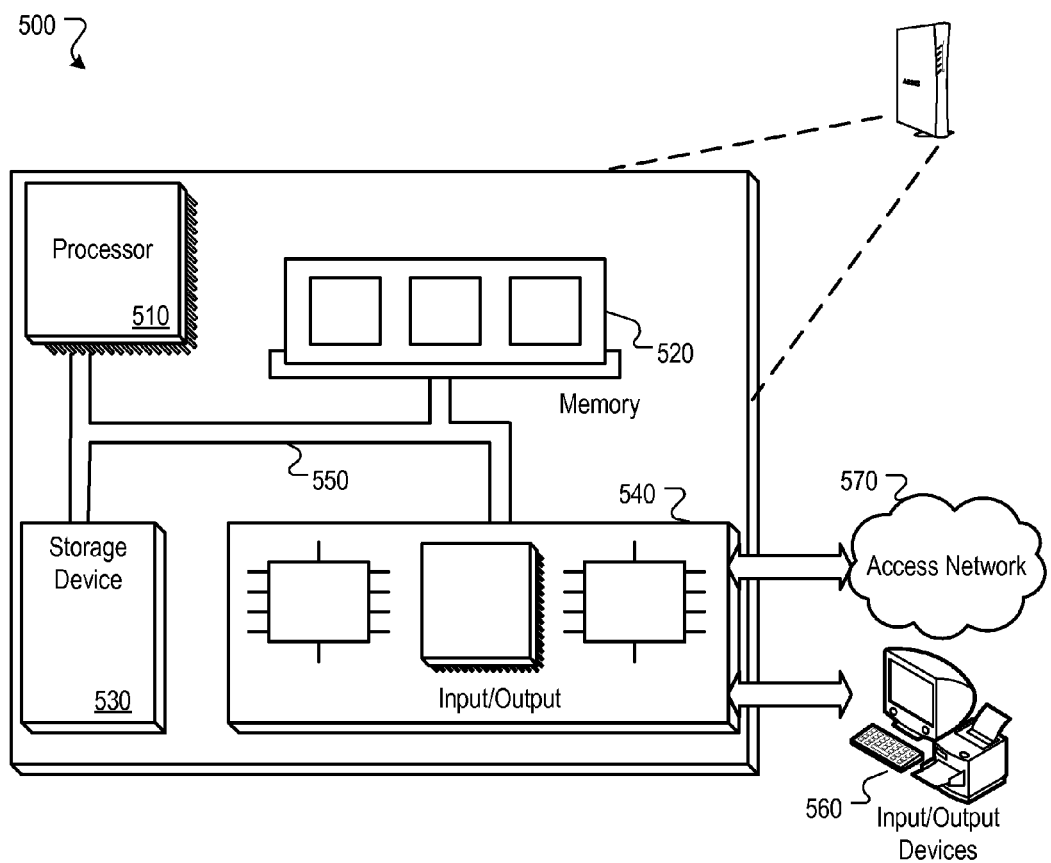
FIG. 5 is a block diagram illustrating a CPE device operable to provide prioritized channel scanning.

FIG. 5 is a block diagram illustrating a CPE device operable to provide prioritized channel scanning. The CPE device 500 can include a processor 510, a memory 520, a storage device 530, and an input/output device 540. Each of the components 510, 520, 530, and 540 can, for example, be interconnected using a system bus 550. The processor 510 is capable of processing instructions for execution within the device 500. In one implementation, the processor 510 is a single-threaded processor. In another implementation, the processor 510 is a multi-threaded processor. The processor 510 is capable of processing instructions stored in the memory 520 or on the storage device 530.

The memory 520 stores information within the device 500. In one implementation, the memory 520 is a computer-readable medium. In one implementation, the memory 520 is a volatile memory unit. In another implementation, the memory 520 is a non-volatile memory unit.

In some implementations, the storage device 530 is capable of providing mass storage for the device 500. In one implementation, the storage device 530 is a computer-readable medium. In various different implementations, the storage device 530 can, for example, include a hard disk device, an optical disk device, flash memory or some other large capacity storage device.

The input/output device 540 provides input/output operations for the device 500. In one implementation, the input/output device 540 can include one or more of a wireless interface, HFC network interface, such as, for example, an IP network interface device, e.g., an Ethernet interface, a cellular network interface, a serial communication device, e.g., and RS-232 port, and/or a wireless interface device, e.g., and 802.11 card. In another implementation, the input/output device can include driver devices configured to receive input data and send output data to other input/output devices such as client/computer 560, as well as sending communications to, and receiving communications from various networks (e.g., access network 570).

The CPE devices of this disclosure, and components thereof, can be realized by instructions that upon execution cause one or more processing devices to carry out the processes and functions described above. Such instructions can, for example, comprise interpreted instructions, such as script instructions, e.g., JavaScript or ECMAScript instructions, or executable code, or other instructions stored in a computer readable medium.

Implementations of the subject matter and the functional operations described in this specification can be provided in digital electronic circuitry, or in computer software, firmware, or hardware, including the structures disclosed in this specification and their structural equivalents, or in combinations of one or more of them. Embodiments of the subject matter described in this specification can be implemented as one or more computer program products, i.e., one or more modules of computer program instructions encoded on a tangible program carrier for execution by, or to control the operation of, data processing apparatus. The tangible program carrier can be a propagated signal or a computer readable medium. The propagated signal is an artificially generated signal, e.g., a machine generated electrical, optical, or electromagnetic signal that is generated to encode information for transmission to suitable receiver apparatus for execution by a computer. The computer readable medium can be a machine readable storage device, a machine readable storage substrate, a memory device, a composition of matter effecting a machine readable propagated signal, or a combination of one or more of them.

The term "system processor" encompasses all apparatus, devices, and machines for processing data, including by way of example a programmable processor, a digital signal processor, a computer, or multiple processors or computers. The system processor can include, in addition to hardware, code that creates an execution environment for the computer program in question, e.g., code that constitutes processor firmware, a protocol stack, a database management system, an operating system, or a combination of one or more of them.

A computer program (also known as a program, software, software application, script, or code) can be written in any form of programming language, including compiled or interpreted languages, or declarative or procedural languages, and it can be deployed in any form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification are performed by one or more programmable processors executing one or more computer programs to perform functions by operating on input data and generating output thereby tying the process to a particular machine (e.g., a machine programmed to perform the processes described herein). The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both. The elements of a computer typically include a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile communications device, a telephone, a cable modem, a set-top box, a mobile audio or video player, or a game console, to name just a few.

Computer readable media suitable for storing computer program instructions and data include all forms of non volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD ROM disks. The processor and the memory can be supplemented by, or incorporated in, special purpose logic circuitry.

To provide for interaction with a user, embodiments of the subject matter described in this specification can be operable to interface with a computing device having a display, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

While this specification contains many specific implementation details, these should not be construed as limitations on the scope of any invention or of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Particular embodiments of the subject matter described in this specification have been described. Other embodiments are within the scope of the following claims. For example, the actions recited in the claims can be performed in a different order and still achieve desirable results, unless expressly noted otherwise. As one example, the processes depicted in the accompanying figures do not necessarily require the particular order shown, or sequential order, to achieve desirable results. In some implementations, multitasking and parallel processing may be advantageous.

What is claimed is:

1. A method, comprising:
storing a list of most recently used channels in a nonvolatile data store for a customer premise equipment device;
prioritizing DOCSIS 3.0 upstream channels within the list of most recently used channels;
reinitializing the customer premise equipment device based on the prioritizing of DOCSIS 3.0 upstream channels on list of most recently used channels.

2. The method of claim 1, further comprising determining that the customer premise equipment device is a DOCSIS 3.0 device before reordering the list of most recently used channels.

3. The method of claim 1, wherein prioritizing DOCSIS 3.0 channels on the list comprises reordering the list of most recently used channels.

4. The method of claim 3, wherein reordering the list of most recently used channels comprises moving any DOCSIS 3.0 channels on the list of most recently used channels to the front of the list of most recently used channels.

5. The method of claim 1, wherein prioritizing DOCSIS 3.0 upstream channels comprises scanning the list for DOCSIS 3.0 channels during reinitialization and using any DOCSIS 3.0 channels on the list of most recently used channels before using any legacy channels on the list of most recently used channels.

6. The method of claim 1, wherein prioritizing DOCSIS 3.0 upstream channels within the list of most recently used channels comprises reserving a minimum number of places on the list for DOCSIS 3.0 channels.

7. The method of claim 1, wherein prioritizing DOCSIS 3.0 upstream channels within the list of most recently used channels comprises storing a first list of most recently used DOCSIS 3.0 channels and a second list of most recently used legacy channels, and providing preference to DOCSIS 3.0 channels.

* * * * *